(12) United States Patent
Maikim et al.

(10) Patent No.: US 11,867,915 B2
(45) Date of Patent: Jan. 9, 2024

(54) HEAD MOUNTED DISPLAY WITH OBSCURED LIGHT EMITTING DIODES

(71) Applicant: Microsoft Technology Licensing, LLC, Redmond, WA (US)

(72) Inventors: Jessie Cindy Maikim, Mountain View, CA (US); Christopher Charles Aholt, Newcastle, WA (US); James Peele Terrell, Jr., Bellvue, CO (US); Jordan Christopher Jur, Timnath, CO (US); Joel Steven Kollin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/219,077

(22) Filed: Mar. 31, 2021

(65) Prior Publication Data

US 2022/0317461 A1    Oct. 6, 2022

(51) Int. Cl.
*G02B 27/01* (2006.01)
*G06F 3/01* (2006.01)
*H04N 23/57* (2023.01)

(52) U.S. Cl.
CPC ..... *G02B 27/0179* (2013.01); *G02B 27/0172* (2013.01); *G06F 3/013* (2013.01); *H04N 23/57* (2023.01); *G02B 2027/0138* (2013.01); *G02B 2027/0178* (2013.01); *G02B 2027/0187* (2013.01)

(58) Field of Classification Search
CPC ........... G02B 27/0179; G02B 27/0172; G02B 2027/0138; G02B 2027/0178; G02B 2027/0187; G06F 3/013; H04N 5/2257
See application file for complete search history.

(56) References Cited

U.S. PATENT DOCUMENTS

| | | | |
|---|---|---|---|
| RE42,471 E | 6/2011 | Torch | |
| 9,033,502 B2 | 5/2015 | Nistico et al. | |
| 2015/0061995 A1* | 3/2015 | Gustafsson | H04N 23/56 348/78 |
| 2015/0061996 A1 | 3/2015 | Gustafsson et al. | |
| 2016/0187673 A1* | 6/2016 | Maitre | G02C 11/04 351/158 |
| 2016/0246367 A1* | 8/2016 | Tungare | G06F 3/0237 |
| 2020/0348753 A1 | 11/2020 | Lundberg et al. | |
| 2020/0394456 A1* | 12/2020 | Boulanger | G06F 3/013 |

OTHER PUBLICATIONS

"International Search Report and Written Opinion Issued in PCT Application No. PCT/US22/020287", dated Jul. 8, 2022, 11 Pages.

* cited by examiner

*Primary Examiner* — Dave Czekaj
*Assistant Examiner* — Berteau Joisil
(74) *Attorney, Agent, or Firm* — Schwegman Lundberg & Woessner, P.A.

(57) ABSTRACT

A device includes a frame configured to be supported in front of a user eye. The frame has a first side facing the user eye and a second side opposite the first side and facing an environment. A light emitting diode is supported by the frame to emit light. The light emitting diode is obscured by an opaque material from an observer in front of the user in the environment. A light deflector is supported by the frame to direct the emitted light from the light emitting diode towards the user eye.

19 Claims, 8 Drawing Sheets

HEAD MOUNTED DISPLAY WITH OBSCURED LIGHT EMITTING DIODES

BACKGROUND

Eye tracking usually requires illumination (light directed to the eye) which can be provided using a number of infrared LEDs in front of the eyes. These LEDs can be placed in several locations around the eye to enable eye tracking by illuminating the eye. Currently, most eye tracking systems use illumination LEDs that are visible to the user. Since the LEDs need to shine light to the eye, they are usually placed in line of sight to the eye. Such LEDs are generally visible to both a user and an observer of the user.

SUMMARY

A device includes a frame configured to be supported in front of a user eye. The frame has a first side facing the user eye and a second side opposite the first side and facing an environment. A light emitting diode is supported by the frame to emit light. The light emitting diode is obscured by an opaque material from an observer in front of the user in the environment. A light deflector is supported by the frame to direct the emitted light from the light emitting diode towards the user eye.

DETAILED DESCRIPTION

Figure 1:
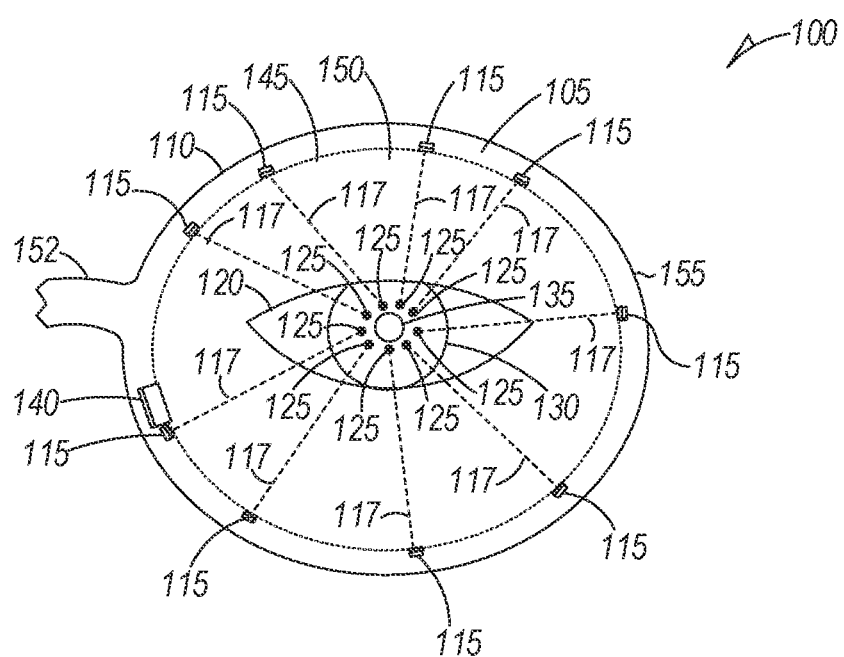
FIG. 1 is a front partial view block diagram of a first side of a portion of a head mounted display device according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

LEDs used in a head mounted display device for eye tracking may be hidden while still providing suitable illumination. In various embodiments, the LEDs may be supported on a frame of the device that hides the LEDs from being seen by an observer in a world or environment side of the devices when worn by the user. The LEDs are positioned to still provide light towards the eye on the user side of the device. The LEDs may be supported by the frame in a manner such that the user will not have LEDs obstructing their line of sight. The LEDs can also be hidden from the user or observer, or both by an opaque background behind the LEDs in the world side of the device.

An asymmetric IR light beam angle may be used to hide the LEDs and enable the IR light beam to reach the eye. This angle can be achieved using a diffuser, prism, light pipe, tilting of the LED or other means to redirect or concentrate the light to the eye. The redirection of light solely to the eye also enables a reduction of stray light inside of the optical surfaces in the device. As a result, eye tracking can be more reliable and accurate by reducing errors attributed to stray lights cause by internal refractions.

FIG. 1 is a front partial view block diagram of a first side 105 of a portion of a head mounted display device 100. The view is looking at the device 100 from a world view. In other words, from the view of an observer of a user wearing the device 100. The partial view shows a frame 110 that supports at least one light emitting diode (LED) 115. In one embodiment, multiple LEDs 115 are dispersed around a perimeter of the frame 110. The LEDs 115 are supported by the frame 110 to direct infrared (IR) light 117 (represented by broken lines) towards an eye 120 to create a light spot, referred to as a glint 125 on an iris 130 of the eye 120.

In one embodiment, multiple LEDs 115 direct light 117 toward the eye 120, creating multiple glints 125 on the iris 130 in a pattern surrounding a pupil 135. The pattern of glints 125 is shown with a user's eye directed straight ahead so that the glints 125 surround the iris 130. A camera 140 has a field of view directed toward the eye 120 to capture images of the eye 120, including the glints 125. Known image processing is used to perform eye tracking as a function of the relative position of the iris 135 with respect to the glints 125 in a known manner.

In one embodiment, a portion of the frame 100 includes an inner edge 145 (represented by a broken line) of the frame 110 that extends over the LEDs 115, hiding them from view of an observer in the world looking at the user wearing the device 100. This portion of the frame may also support at least one of a display or lens indicated at 150.

In further embodiments, the LEDs 115 may be at least partially obscured by any opaque material disposed between the LEDs 115 and the observer, such as an opaque coating on the lens 150 that may extend to cover the LEDs 115 wherein frame lacks the inner edge 145. The shape of the frame and lens are shown as somewhat oval shaped, but the shape of each may vary in further embodiments.

Note that only a left portion of the frame 110 is shown. A right portion may be configured in the same manner as the left portion. The left and right portions of the frame 110 may be connected by a nose piece 152 and may also include ear pieces or stems 155 or other means of holding the frame 110 on a user's head such that the left and right portions of the frame 110 are supported in front of the wearer's eye. In further embodiments, the frame 110 may be part of a goggle supported to the user by a strap or a fit system.

Figure 2:
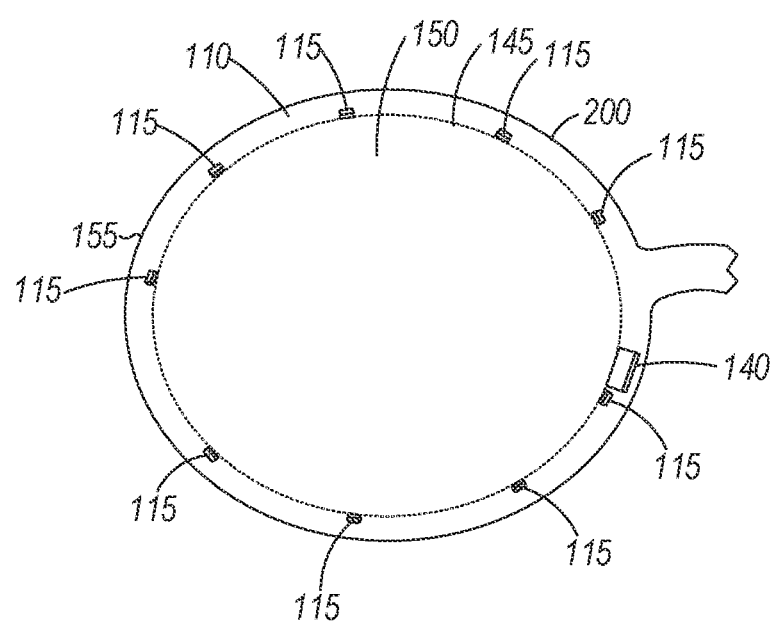
FIG. 2 is a back partial view block diagram of a second side of the portion of the head mounted display device of FIG. 1 according to an example embodiment.

FIG. 2 is a back partial view block diagram of a second side 200 of the portion of the head mounted display device 100. The view is looking at the device 100 from the user's eye 120. Note that the eye is not visible in FIG. 2 as the view is looking out from the eye. In one embodiment, the LEDs 115 are also optionally hidden by the frame, as the inner edge 145 extends to the LEDs 115. The LEDs 115 thus do not obstruct the field of view or otherwise cause distraction for the wearer. Flex circuitry, not shown, may also be hidden by the frame 110 and couple to the camera 140 and LEDs 115, as well as control circuitry and a power source which may be supported elsewhere by the frame 110, as the ear pieces or stems 155.

Figure 3:
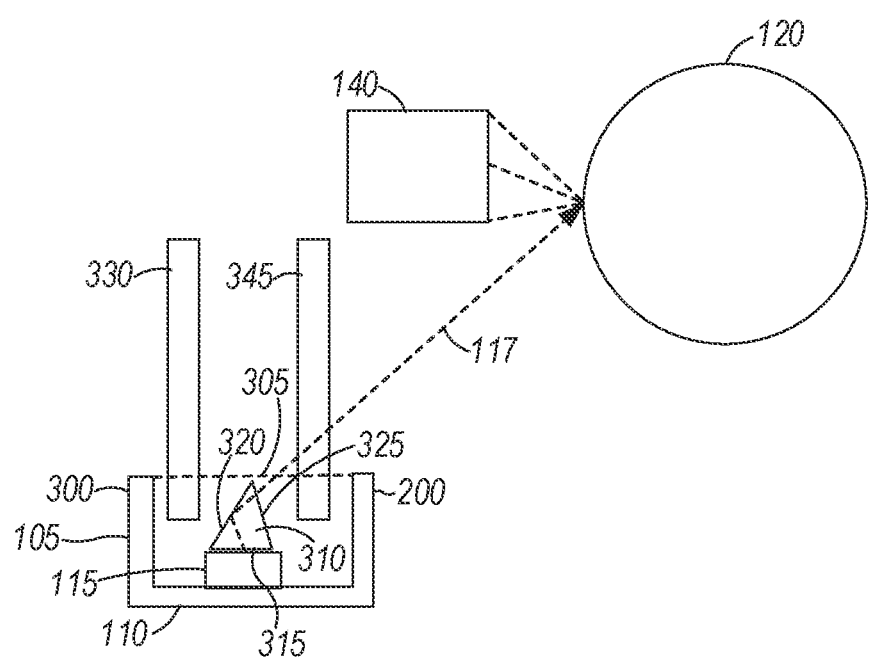
FIG. 3 is a block diagram illustrating a portion of a frame showing one of multiple LEDs emitting light according to an example embodiment.

FIG. 3 is a block diagram illustrating a portion 300 of frame 100 showing one of the LEDs 115 emitting light 117. The portion 300 of the frame 100 is opaque on the first side 105 facing the world and optionally on the side facing the wearer/user. The portion 300 thus substantially obscures the LED 115 from view by an observer in the world. A broken line 305 shows that the opaque characteristic extends beyond a direct line of sight of an observer in the real world looking at the wearer while the wearer has their head directed toward the observer. From extreme angles, the LED may be partially viewable to the observer.

In one embodiment, the LED 115 in FIG. 3 directs the light along a plane of the frame that is orthogonal or transverse to the light of sight of the wearer. To direct the light toward the user's eye 120, a light deflector, such as a mirror or prism 310, may be optically coupled to the LED 115 and positioned to receive the light at a first side 315 of the prism 310 that may be transverse to the direction of the light 117. The prism may be coupled to the LED via an epoxy having an index of refraction similar to the prism 310. The light proceeds to a second side 320 of the prism 310 where it is reflected toward the eye 120. The light then exits the prism via a third side 325 towards the eye to form one of the glints 125. Camera 140 is shown to observe the eye and provide images for eye tracking.

Optional positions for a lens supported by the frame 110 are shown at 330 and 335. Lens position 330 shows the lens supported by the frame toward the first side 105 of the frame 100. Lens position 335 shows the lens supported by the frame toward the second side 200 of the frame 100. Note that the lens position 335 may cause some refraction of the LED light 117 calling for suitable adjustment of the prism 310 to account for such refraction. The lens may include a display in some embodiments for augmented or virtual reality experience display via the device 100.

The frame 110 in one embodiment is thus configured to be supported in front of the user eye 120 and has a first side facing the user eye and a second side opposite the first side that faces the environment or world. The light emitting diode or diodes 115 are supported by the frame 110 to emit light 117 toward the eye. The light emitting diode or diodes are obscured by the second side of the frame 110 (or other opaque materials) from an observer in front of the user on the world side of the frame 110. Light deflector supported by the frame to direct the emitted light from the light emitting diode towards the user eye.

Figure 4:
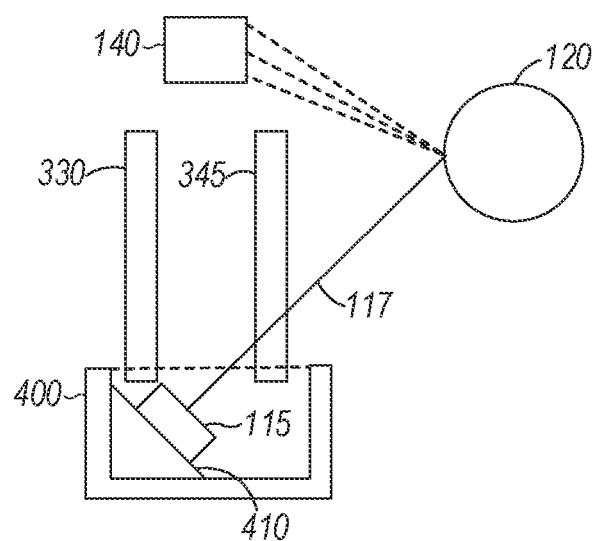
FIG. 4 is a block diagram illustrating a portion of a frame showing one of multiple LEDs emitting light with an alternative means for deflecting light toward an eye according to an example embodiment.

FIG. 4 is a block diagram illustrating a portion 400 of frame 100 showing one of the LEDs 115 emitting light 117 with an alternative means for deflecting light 117 toward the eye 120. A wedge 410 may be added to the frame 100 to deflect the light directly toward the eye 120. The angle of the wedge will vary for different LEDs 115 disposed around the perimeter of the frame such that a desired pattern of glints 125 is obtained.

Figure 5:
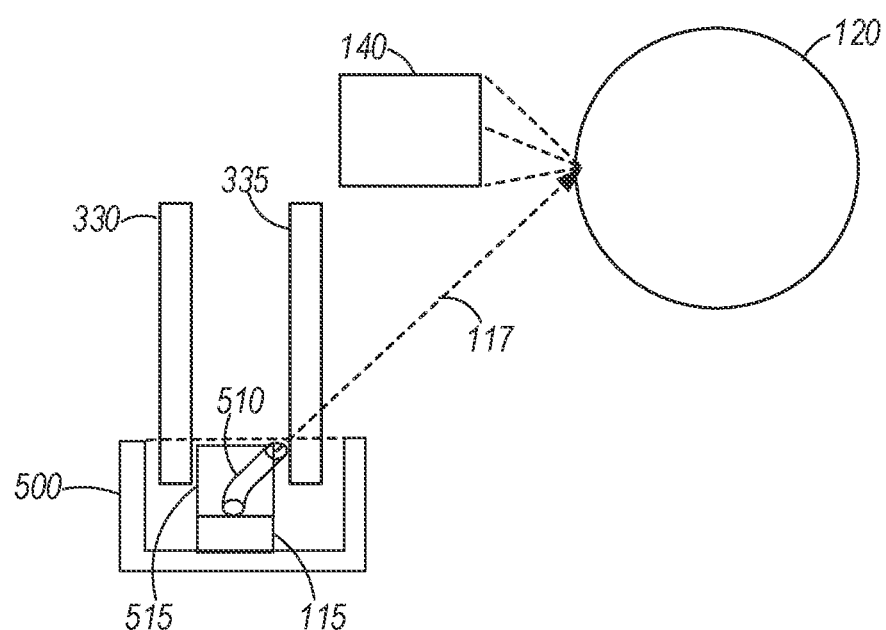
FIG. 5 is a block diagram illustrating a portion of a frame showing one of multiple LEDs emitting light with an alternative means for deflecting light toward an eye according to an example embodiment.

FIG. 5 is a block diagram illustrating a portion 500 of frame 100 showing one of the LEDs 115 emitting light 117 with an alternative means for deflecting light 117 toward the eye 120. A light pipe 510 may be added to the frame 100 to deflect the light directly toward the eye 120. The light pipe 510 may be optically coupled to the LED and supported in a desired direction via an epoxy 515 in one embodiment. The epoxy 515 may have a similar or identical index of refraction as the LED in one embodiment. Each light pipe optically coupled to different LEDs 115 disposed around the perimeter of the frame such that a desired pattern of glints 125 is obtained.

Figure 6:
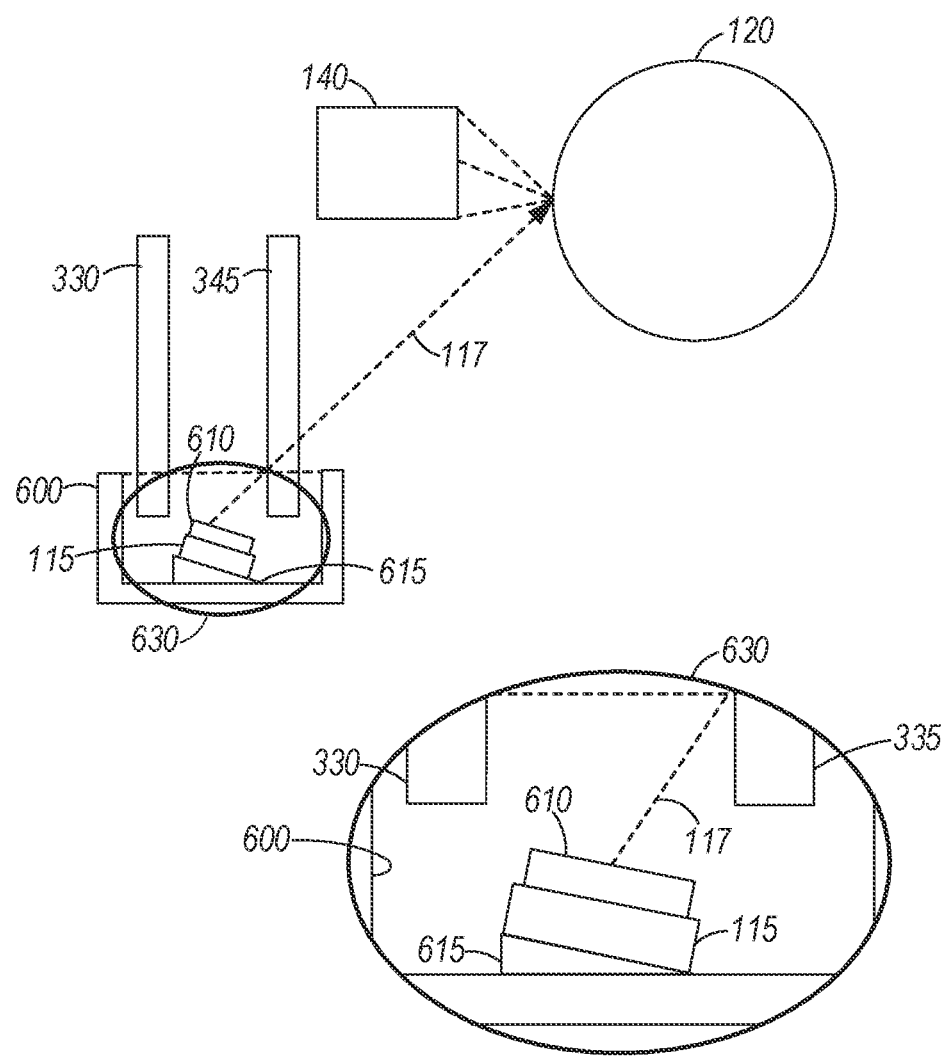
FIG. 6 is a block diagram illustrating a portion of a frame showing one of multiple LEDs emitting light with an alternative means for deflecting light toward an eye according to an example embodiment.

FIG. 6 is a block diagram illustrating a portion 600 of frame 100 showing one of the LEDs 115 emitting light 117 with an alternative means for deflecting light 117 toward the eye 120. A diffraction grating 610 may be coupled to the LED 115 to deflect the light directly toward the eye 120. Diffraction gratings vary for different LEDs 115 disposed around the perimeter of the frame such that a desired pattern of glints 125 is obtained. A wedge 615 between the LED 115 and frame 110 may also be used to control the direction of diffracted light to create the desired pattern of glints 125. A blown-up portion 630 illustrates an example wedge 615 placed between the LED 115 and frame 100 to modify the angle of the light 117. Each LED dispersed around the perimeter of the frame 110 may have a unique wedge, unique grating, or both to ensure proper deflection of the emitted light 117 to form the desired pattern of glints 125.

Figure 7:
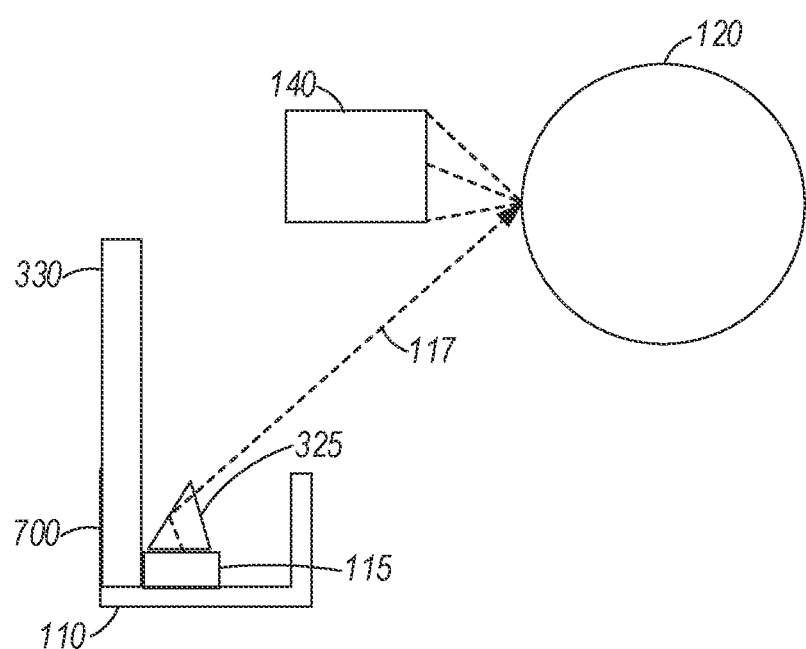
FIG. 7 is a block diagram illustrating the use of an opaque material to obscure the view of an LED according to an example embodiment.

FIG. 7 is a block diagram illustrating one of the LEDs 115 emitting light 117 with the prism 310 directing light toward the eye 120. In this embodiment, lens 330 is supported by the frame 110 and includes an opaque material 700 extending to obscure the LED 115 from an observer. The material 700 may be an opaque paint, or a portion of the lens 330 formed with a light blocking material. The material 700 thus substantially obscures the LED 115 from view by an observer in the world. From extreme angles, the LED may be partially viewable to the observer.

The frame 110 in one embodiment is thus configured to be supported in front of the user eye 120 and has a first side facing the user eye and a second side opposite the first side that faces the environment or world. The light emitting diode or diodes 115 are supported by the frame 110 to emit light 117 toward the eye. The light emitting diode or diodes are obscured by the opaque material 700 from an observer in front of the user on the world side of the frame 110. The opaque material may be supported either on the lens 330 or in further embodiments applied to a portion of the second side of the frame 110. In still further embodiments, the opaque material 700 may be a separate piece or layer supported by the frame or by the lens 330. Similar opaque material may be utilized to obscure the LED and/or prism 325 or other light deflecting means from the user's eye 120.

Figure 8:
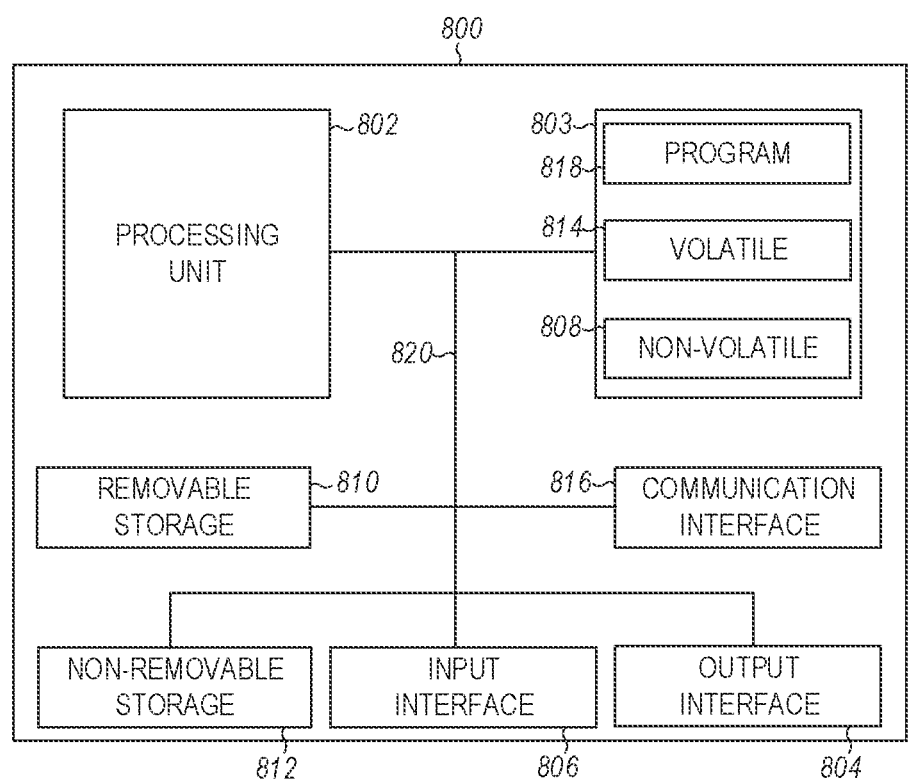
FIG. 8 is a block schematic diagram of a computer system to implement one or more example embodiments.

FIG. 8 is a block schematic diagram of a computer system 800 to control LEDs, cameras, displays, perform eye tracking, and for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 818 along with the workspace manager 822 may be used to cause processing unit 802 to perform one or more methods or algorithms described herein.

EXAMPLES

1. A device includes a frame configured to be supported in front of a user eye, the frame having first side facing the user eye and a second side opposite the first side and facing an environment. A light emitting diode is supported by the frame to emit light, the light emitting diode obscured by an opaque material from an observer in front of the user in the environment. A light deflector is supported by the frame to direct the emitted light from the light emitting diode towards the user eye.

2. The device of example 1 wherein the light deflector is obscured by the opaque material from the observer of the user.

3. The device of any of examples 1-2 wherein the emitted light comprises infrared light and wherein the opaque material comprises the frame.

4. The device of any of examples 1-3 wherein the light emitting diode comprises multiple light emitting diodes distributed about a perimeter of the frame and obscured by the opaque material, each light emitting diode including a light deflector supported by the frame to direct the emitted light towards the user eye.

5. The device of any of examples 1-4 wherein the light deflector comprises a prism optically coupled to the light emitting diode.

6. The device of any of examples 1-4 wherein the light deflector comprises a light pipe optically coupled to the light emitting diode and disposed within epoxy having a compatible index of refraction with the light pipe.

7. The device of any of examples 1-4 wherein the light deflector comprises a diffractor coupled to the light emitting diode.

8. The device of any of examples 1-7 and further comprising a camera supported by the frame to capture images of the user eye.

9. The device of any of examples 1-8 wherein the frame is configured to support eyepieces for each eye having light emitting diodes and light deflectors.

10. The device of any of examples 1-9 wherein the light emitting diodes are coupled to a light emitting diode flex strip.

11. The device of any of examples 1-10 wherein the frame is at least partially opaque such that the light emitting diodes are not directly visible to the user.

12. A system includes a frame configured to hold an eyepiece in front of a field of view of a user eye, the frame coupled at a perimeter of the eyepiece. Multiple light emitting diodes are supported by the frame outside the perimeter of the eyepiece to emit light at a point obscured by an opaque material from the user eye. Light deflectors are supported by the frame to redirect the emitted light from the light emitting diodes towards the user eye to illuminate the user eye for eye tracking.

13. The system of example 12 wherein the light deflectors are obscured by the opaque material from an observer of the user.

14. The system of any of examples 12-13 wherein the emitted light comprises infrared light and wherein the opaque material comprises the frame that is at least partially opaque such that the light emitting diodes are not directly visible to the user.

15. The system of any of examples 12-14 wherein the light emitting diode comprises multiple light emitting diodes distributed about a perimeter of the frame and obscured by the opaque material, each light emitting diode including a light deflector supported by the frame to direct the emitted light towards the user eye.

16. The system of any of examples 12-15 wherein the light deflectors comprise prisms optically coupled to the light emitting diodes.

17. The system of any of examples 12-15 wherein the light deflectors comprise light pipes optically coupled to the light emitting diodes and disposed within epoxy having a compatible index of refraction with the light pipes.

18. The system of any of examples 12-15 wherein the light deflectors comprise diffractors coupled to the light emitting diodes.

19. The system of any of examples 12-18 and further comprising a camera supported by the frame to capture images of the user eye.

20. The system of any of examples 12-19 wherein the frame is configured to support eyepieces for each eye having light emitting diodes and light deflectors and wherein the light emitting diodes are coupled to a light emitting diode flex strip.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
a frame configured to be supported in front of a user eye and to support an eyepiece, the frame having first side facing the user eye and a second side opposite the first side and facing an environment;
a light emitting diode supported by the frame about a perimeter of the frame to emit light, the light emitting diode obscured by an opaque material from an observer in front of the user in the environment; and
a light deflector supported by the frame to direct the emitted light from the light emitting diode towards the user eye to create an eye tracking glint about an iris of the user.

2. The device of claim 1 wherein the light deflector is obscured by the opaque material from the observer in front of the user.

3. The device of claim 1 wherein the emitted light comprises infrared light and wherein the opaque material comprises the frame.

4. The device of claim 1 wherein the light emitting diode comprises multiple light emitting diodes distributed about a perimeter of the frame and obscured by the opaque material, each light emitting diode including a light deflector supported by the frame to direct the emitted light towards the user eye to create a pattern of glints around an iris of the user for performing eye tracking.

5. The device of claim 1 wherein the light deflector comprises a prism optically coupled to the light emitting diode.

6. The device of claim 1 wherein the light deflector comprises a light pipe optically coupled to the light emitting diode and disposed within epoxy having a compatible index of refraction with the light pipe.

7. The device of claim 1 wherein the light deflector comprises a diffractor coupled to the light emitting diode.

8. The device of claim 1 and further comprising a camera supported by the frame to capture images of the user eye.

9. The device of claim 1 wherein the frame is configured to support eyepieces for each eye having light emitting diodes and light deflectors.

10. The device of claim 1 wherein the light emitting diodes are coupled to a light emitting diode flex strip.

11. The device of claim 1 wherein the frame is at least partially opaque such that the light emitting diodes are not directly visible to the user.

12. A system comprising:
a frame configured to hold an eyepiece in front of a field of view of a user eye, the frame coupled at a perimeter of the eyepiece;
multiple light emitting diodes supported by the frame outside the perimeter of the eyepiece to emit light at a point obscured by an opaque material from the user eye and from an observer in front of the user; and light deflectors supported by the frame to redirect the emitted light from the light emitting diodes towards the user eye to create a pattern of eye tracking glints about an iris of the user.

13. The system of claim 12 wherein the emitted light comprises infrared light and wherein the opaque material comprises the frame that is at least partially opaque such that the light emitting diodes are not directly visible to the user.

14. The system of claim 12 wherein the light emitting diode comprises multiple light emitting diodes distributed about a perimeter of the frame and obscured by the opaque material, each light emitting diode including a light deflector supported by the frame to direct the emitted light towards the user eye.

15. The system of claim 12 wherein the light deflectors comprise prisms optically coupled to the light emitting diodes.

16. The system of claim 12 wherein the light deflectors comprise light pipes optically coupled to the light emitting diodes and disposed within epoxy having a compatible index of refraction with the light pipes.

17. The system of claim 12 wherein the light deflectors comprise diffractors coupled to the light emitting diodes.

18. The system of claim 12 and further comprising a camera supported by the frame to capture images of the user eye.

19. The system of claim 12 wherein the frame is configured to support eyepieces for each eye having light emitting diodes and light deflectors and wherein the light emitting diodes are coupled to a light emitting diode flex strip.

\* \* \* \* \*